United States Patent [19]
Hulderman

[11] Patent Number: 5,583,511
[45] Date of Patent: Dec. 10, 1996

[54] STEPPED BEAM ACTIVE ARRAY ANTENNA AND RADAR SYSTEM EMPLOYING SAME

[75] Inventor: Garry N. Hulderman, Riverside, Calif.

[73] Assignee: Hughes Missile Systems Company, Los Angeles, Calif.

[21] Appl. No.: 471,064

[22] Filed: Jun. 6, 1995

[51] Int. Cl.$^6$ .................................................. G01S 7/28
[52] U.S. Cl. ...................... 342/175; 342/70; 342/157; 342/158; 342/371; 343/700 MS; 343/911 R
[58] Field of Search .................................. 342/175, 70, 71, 342/72, 81, 157, 158, 371, 372; 343/700 MS, 911 R

[56] References Cited

U.S. PATENT DOCUMENTS

| | | | |
|---|---|---|---|
| 5,255,004 | 10/1993 | Berkowitz et al. | 343/853 |
| 5,420,595 | 5/1995 | Zhang et al. | 342/368 |
| 5,486,832 | 1/1996 | Hulderman | 342/70 |

*Primary Examiner*—John B. Sotomayor
*Attorney, Agent, or Firm*—Charles D. Brown; Wanda K. Denson-Low

[57] ABSTRACT

A stepped beam transmit antenna that comprises a feed array that includes a dielectric substrate and a plurality of radiating elements disposed on the substrate. The radiating elements each comprise two coplanar and coextensive fins that are separated by a narrow gap and that are tapered at their radiating end to form a linear tapered slot feed aperture. Beam position inputs are disposed at respective input ends of each of the radiating elements. A backshort is disposed adjacent the tapered slot feed aperture of each of the radiating elements. A low pass filter is disposed adjacent the backshort of each of the radiating elements. A switching diode is disposed between the backshort and the tapered slot feed aperture of each of the radiating elements. The antenna includes a power distribution network comprising a suspended printed line. A lens is disposed adjacent the feed array for projecting energy beams produced by the antenna. A radar system is also disclosed that has a transmitter coupled to the transmit antenna, and a receive beam antenna that is coupled to a radar signal processor for processing radar return signals to produce a radar image.

8 Claims, 2 Drawing Sheets

5,583,511

1

STEPPED BEAM ACTIVE ARRAY ANTENNA AND RADAR SYSTEM EMPLOYING SAME

BACKGROUND

This invention relates generally to antennas, and more particularly, to a stepped beam active array antenna and radar system employing same.

Presently, there are many applications for antennas and radar systems that require high angular resolution with limited antenna size. Consequently, systems that operate in upper millimeter wave frequencies (60 to 150 GHz) are becoming more attractive. With the maturity of technology at these shorter wavelengths involves the use of little more than an extension of microwave hardware. However, the majority of the antenna components use standard waveguide transmission and cavity elements. The problem is that waveguide technology, manufactured in any form, is limited in how inexpensively it can be produced in high volume production. In addition, for automotive requirements (<2 degree resolution and 30 degree azimuth coverage) a narrow beam mechanically scanned antenna has heretofore been the only available option. For most low-cost automotive applications, a girobaled flapping antenna is not an optimum solution.

Accordingly, it is an objective of the present invention to provide for a stepped beam active array antenna and radar system employing same.

SUMMARY OF THE INVENTION

To meet the above and other objectives, the present invention is a stepped beam active array transmit antenna and radar system. The present antenna comprises a feed array that includes a dielectric substrate, a plurality of radiating elements disposed on the substrate that each comprise two coplanar and coextensive fins that are separated by a narrow gap and that are tapered at their radiating end to form a linear tapered slot feed aperture, beam position inputs respectively disposed at an input end of each of the radiating elements, a backshort disposed adjacent the tapered slot feed aperture of each of the radiating elements, a low pass filter disposed adjacent the backshort of each of the radiating elements, and a switching diode disposed between the backshort and the tapered slot feed aperture of each of the radiating elements. The antenna also includes a power distribution network comprising a feed waveguide, and a suspended printed line disposed in the feed waveguide. A lens is disposed adjacent the feed array that is used to project energy beams produced by the antenna.

The present transmit antenna incorporates a quasioptical active line array along with a simple lens or reflector, and in a particular reduced-to-practice embodiment, provides up to sixteen independent overlapping (−3 dB point) beams. This embodiment of the transmit antenna thus provides a field of view of 16 times the aperture beamwidth across a plane. By using optical techniques at the image plane of the aperture, diode switched printed circuit elements electrically step the beam across the field-of-view. The present transmit antenna demonstrates these characteristics with high efficiency and may be produced as a very low cost, and is operational into the upper millimeter wavelengths (>150 GHz).

The present invention provides a very low cost approach to producing radar systems that operate at upper millimeter wave frequencies and which generate active narrow beams over a large field of view. This has been achieved with low loss and is an efficient non-mechanical scanning solution for

2 many applications including automotive cruise control and collision avoidance radar systems. As an example, total material costs to construct an eleven element proof-of-principle embodiment of the transmit antenna was $425 dollars including the lens. Furthermore, although the transmit antenna has been developed for use in automotive speed control and collision avoidance applications, it may be employed in weapon systems that require electronic scanning, spatial power combining, and imaging to wavelengths less than 2 mm.

A radar system of the present invention comprises the present transmit antenna and a receive antenna described in U.S. patent application Ser. No. 08/269,729, filed Jul. 1, 1994, entitled "RF Sensor and Radar for Automotive Speed and Collision Avoidance Applications", in combination with a radar transmitter and signal processor.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
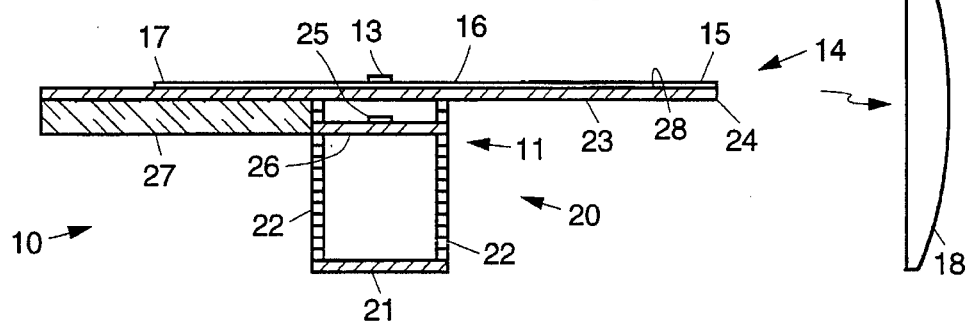
FIG. 1 shows a side view of a millimeter wave stepped beam active array transmit antenna in accordance with the principles of the present invention.

Referring to the drawing figures, FIG. 1 shows a millimeter wave stepped beam active array transmit antenna 10 in accordance with the principles of the present invention. The transmit antenna 10 includes a power distribution network 20 comprising a suspended printed line 11 or suspended microstrip line 11 that couples millimeter wave energy to a feed array 14 comprising a plurality of switching diodes 13 and a plurality of radiating elements 15 (transmit elements 15).

The feed array 14 includes a printed circuit 16 that comprises a plurality of beam position inputs 17 at an input end and the plurality of radiating elements 15 at an output end. A switching diode 13 is disposed adjacent each of the plurality of radiating elements 15 and is used to turn the respective radiating elements 15 "on" and "off". The feed array 14 will be described in more detail with reference to FIG. 2. The feed array 14 radiates millimeter wave energy transmitted by the plurality of radiating elements 15 through a lens 18. In a proof-of-principle transmit antenna 10 that was reduced to practice, a polystyrene lens 18 was used. The complete proof-of-principle transmit antenna 10 using eleven radiating elements 15 weighed twenty-one grams and cost $90 in materials, excluding the lens 18.

The power distribution network 20 for the transmit antenna 10 includes a metal backplate 21 that is attached to a plurality of metal sidewalls comprising wall shims 22 that are attached to a bottom surface 23 of a dielectric substrate 24 on which the plurality of radiating elements 15 are formed. The suspended printed line 11 or suspended microstrip line 11 is formed using a printed feed line 25 disposed on a dielectric board 26 that is located within the power distribution network 20 a predetermined distance between the bottom surface 23 of the dielectric substrate 24 and the metal backplate 21. A dielectric backing plate 27, which may be made of plastic, for example, is secured beneath the dielectric substrate 24 and to one side of the power distribution network 20.

Figure 2:
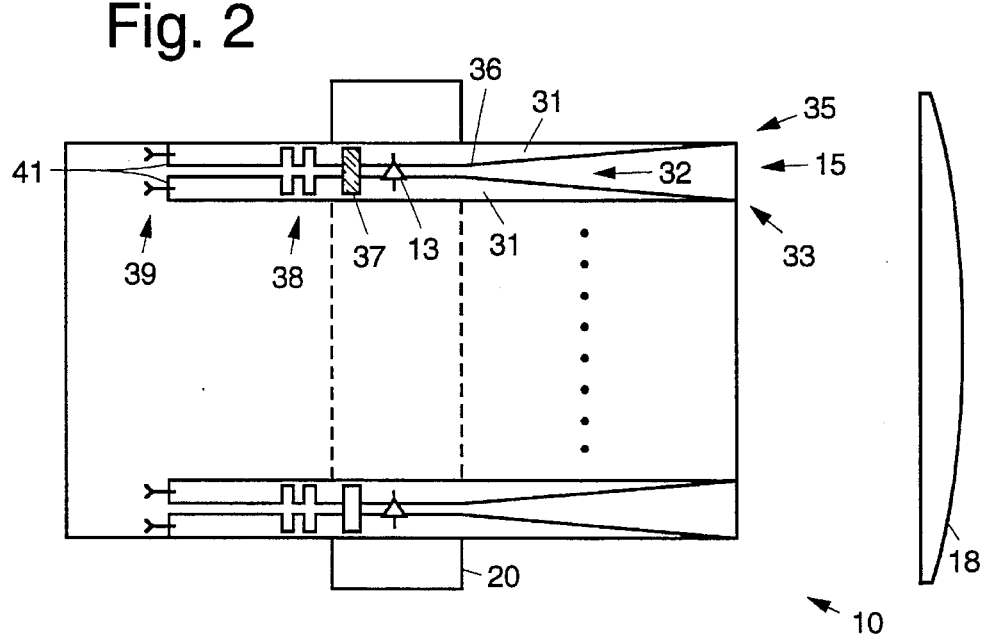
FIG. 2b shows a top view of the transmit antenna of FIG. 1.

A more detailed diagram of the transmit antenna 10 is shown in FIG. 2. FIG. 2 shows a top view of the transmit antenna 10 of FIG. 1. Details of the radiating elements 15 of the transmit antenna 10 are shown more clearly in FIG. 2b. The feed array 14 comprises the printed circuit 16 that may be made of copper, for example, that is formed on a top surface 28 of the dielectric substrate 24 distal from the metal backplate 21. The copper printed circuit 16 is configured to form the plurality of radiating elements 15. Each of the radiating elements 15 includes two coplanar and coextensive metal (copper) portions 31 comprising metallized fins 31 that are separated by a narrow gap 32 and that are tapered at their output end 33 (radiating end 33) to form a linear tapered slot feed aperture 35. The metallized fins 31 taper away from the gap 32 from a taper apex 36 toward the radiating end 33 of the transmit antenna 10. The two metal portions 31 together form one radiating element 15.

The power distribution network 20 is generally disposed below the taper apex 36 at a position that is slightly away from the taper apex 36 along the gap 32. A backshort 37, that may be comprised of ceramic material, for example, is disposed behind the taper apex 36 distal from the radiating element 15. A low pass filter 38 is also formed in the metal portions 31 (fins 31) adjacent to the backshort 37 of each radiating element 15. Beam position control elements 39 are coupled to rear or input ends 41 of each of the radiating elements 15.

With regard to a reduced-to-practice embodiment of the transmit antenna 10, the individual radiating elements 15 were etched from single sided, ½ ounce copper, 0.001 inch thick dielectric printed circuit board 24. A 10 dB taper on the lens 18 was accomplished by using a 0.12 inch wide linear tapered slot feed aperture 35. This made it possible to offset the radiating elements 15 in their physical position from the axial centers of the radiating elements 15 by 0.75 of the half power beamwidth and still fully sample the focal plane of the transmit antenna 10. Located slightly behind the taper apex 36 of each feed aperture 35 is a gallium arsenide (GaAs) beamlead switching diode 13 that is positioned across the narrow gap 32 (0.004") between metallized fins 31 that form each of the radiating elements 15. The respective radiating elements are about 0.1 inch wide and are separated from each other by about 0.3 inches. The printed feed line 25 is disposed at a location adjacent the bottom surface 23 of the dielectric substrate 24 that is a distance that is about $\frac{1}{100}$ of the separation distance between the bottom surface 23 of the dielectric substrate 24 and the metal backplate 21.

The respective positions of the diode 13 and the backshort 37 of each radiating element 15 are adjusted to control the radiated energy (beam) of each radiating element 15. By applying a forward current through the diode 13, an electrical short exists across the gap 32 between the metallized fins 31, and coupled energy is reflected back into the distribution network 20, and therefore is not radiated. When a reverse current is applied to the diode 13, the circuit is open, allowing the energy field across the gap 32 to radiate from the radiating element 15 into the lens 18 and generate a single beam. The position in space of the radiated beam is a function of the off-axis position of the active radiating element 15. This switching technique allows very rapid (nanosecond) beam selection within the field-of-view.

One important aspect of the transmit antenna 10 is a means by which a large percentage of the available millimeter wave power may be selectively absorbed into a single radiating element 15. This is achieved using the suspended printed line 11 and controlling the coupling (spacing) between the energized line 11 and the gap 32 of the radiating element 15. A metal wall on either side of the suspended line is comprised of a series of stacked 0.002 inch metal shims 22 whose height may be varied depending on the number of radiating elements 15 in the feed array 14 and the desired amount of coupling. On-to-off beam isolation was found to be typically 17 dB with sidelobe across the feed array 14 less than 18 dB.

The present invention also envisions a monostatic transmit/receive stepped beam radar system 100 that employs the above-described transmit antenna 10 along with a stepped beam receive focal plane array antenna 120 described in U.S. patent application Ser. No. 08/269,729, filed Jul. 1, 1994, entitled "RF Sensor and Radar for Automotive Speed and Collision Avoidance Applications", which is assigned to the assignee of the present invention. This patent application is incorporated herein by reference in its entirety. This patent application describes the stepped beam receive focal plane array antenna 120 in which beam selection is accomplished by switching an IF channel. At the time of this prior invention, no technique had yet been devised to independently and efficiently control coupling of an RF source for a high level switchable transmit array, and a low level local oscillator (LO) power receive mixer array. This made it necessary to use a bistatic configuration (receive narrow stepped beams, transmit flood beam) in this prior invention. As a result of the use of only one-way sidelobes (characteristic of a bistatic system), the system performance in rejecting off-angle objects was considered somewhat marginal. This problem is remedied using the present transmit antenna 10 in combination with the prior receive antenna 120 and associated radar system components.

Figure 3:
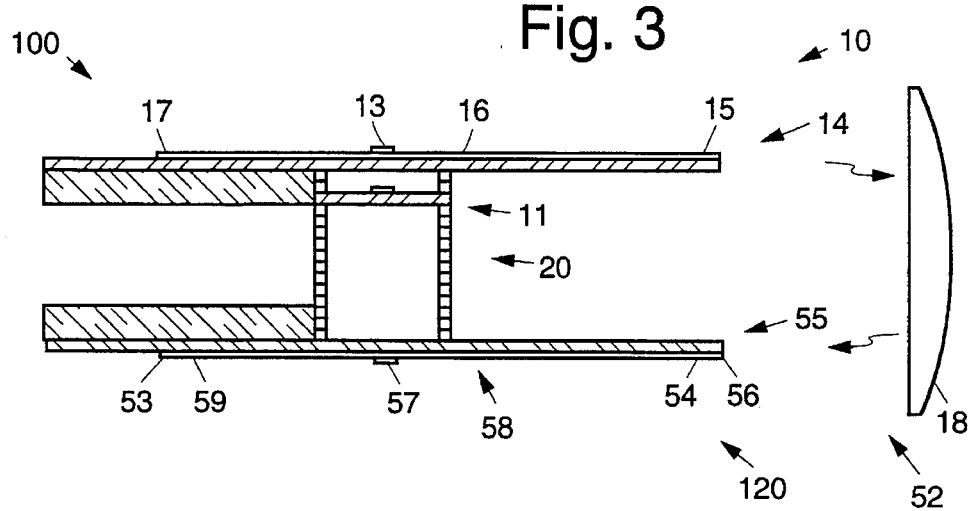
FIG. 3 shows a monostatic transmit/receive stepped beam radar system employing the transmit antenna of FIG. 1.

More specifically, FIG. 3 is a diagram of the monostatic transmit/receive stepped beam radar system 100 that integrates the present transmit antenna 10 and the stepped beam receive antenna 120 described in the above-cited patent application into a single aperture 52. The transmit antenna 10 is configured as described above except that the metal backplate 21 is absent from the power distribution network 20. The receive antenna 120 is comprised of a printed circuit board 53 that includes a plurality of receive elements 54 having linear tapered slot feed apertures 55 located at an input end 56 thereof. A plurality of mixer diodes 57 are disposed adjacent to each taper apex 58 of the plurality of receive elements 54 in a manner similar to the plurality of switching diodes 13 of the transmit antenna 10. A plurality of receive beam position switch outputs 59 are disposed at output ends of the plurality of receive elements 54 that are similar to the beam position inputs 17 of the transmit antenna 10. By stepping in angle, pairs of transmit and receive elements 15.54 are switched to cover the field of view (eleven positions) in a few microseconds while maintaining two-way sidelobe rejection.

Figure 4:
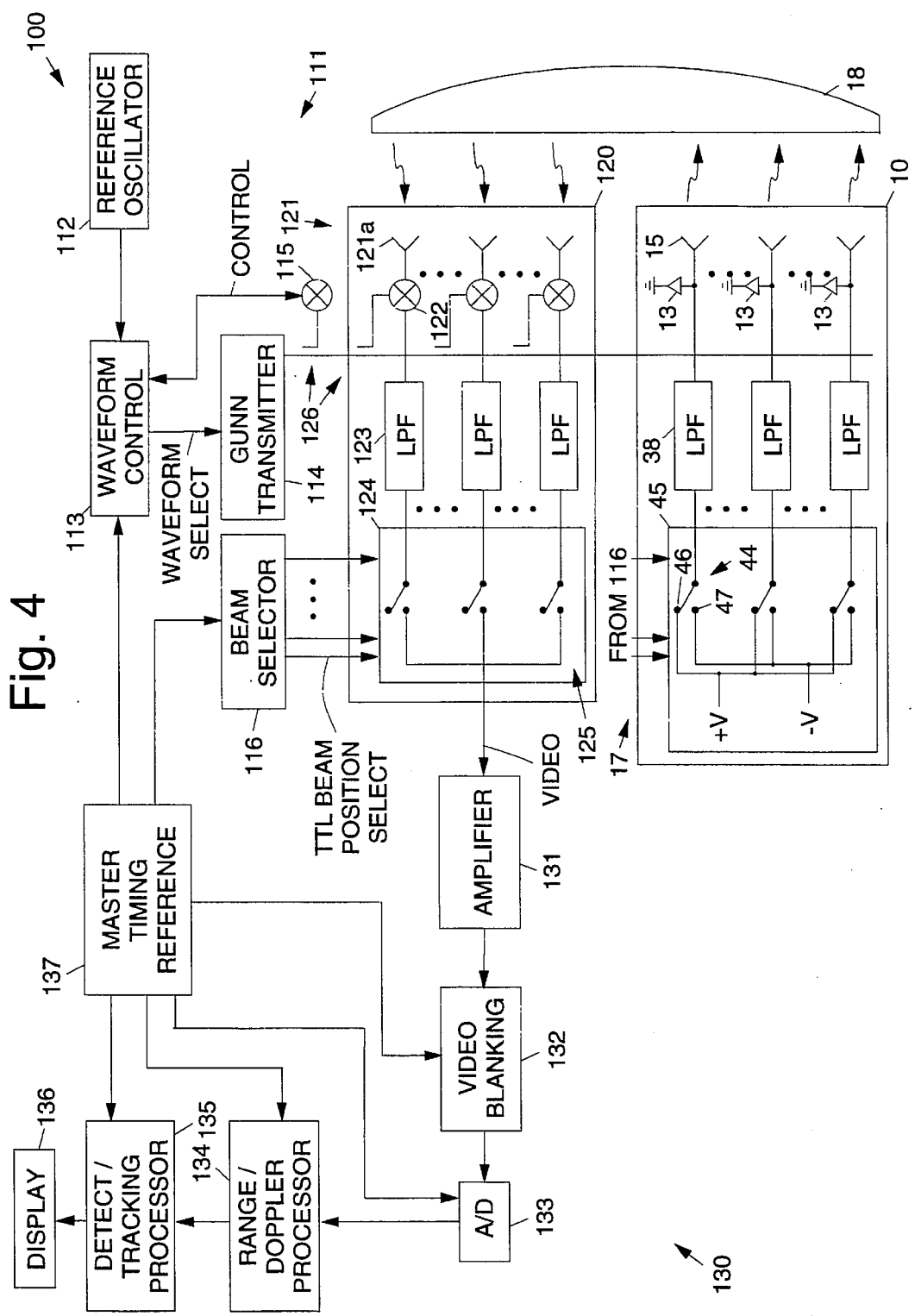
FIG. 4 shows a system block diagram of the radar system of FIG. 3.

FIG. 4 shows a detailed block diagram of the radar system 100. The radar system 100 comprises an FMCW transmitter 111 that includes a reference oscillator 112, a waveform control circuit 113, a Gunn transmitter 114, a beam selector circuit 116, a harmonic mixer 115, and the present transmit antenna 10. These components are interconnected in a conventional manner as is illustrated in FIG. 4. The Gunn transmitter 114 is used in a conventional manner as a transmitter and mixer local oscillator for FMCW radar energy transmission. The Gunn transmitter 114 is also used in a conventional manner as a mixer local oscillator only, in conjunction with the receive antenna 120, for receiver applications.

The switching diodes 13 of the transmit antenna 10 are coupled to the Gunn transmitter 114. The beam selector circuit 116 is coupled to respective switches 44 of a switching diode bias controller 45 which selectively activate each of the radiating elements 15. Each of the switches 44 of the switching diode bias controller 45 have two inputs 46, 47 that are respectively coupled to positive and negative voltage supplies (+V, −V). The plurality of beam position inputs 17 selectively switch individual ones of the switches 44 of the switching diode bias controller 45 which selectively opens and closes the switching diode 13 of the respective radiating element 15.

The receive antenna 120 comprises a receiver 121 that includes a plurality of antenna elements 121a. Each of the antenna elements 121a are coupled by way of a mixer 122 through a filter circuit 123 to a multiplexer 124. The multiplexer 124 functions as a multiple input, single output switch 125 that is controlled by means of the beam selector circuit 116 to selectively and sequentially outputting video signals derived from radar signals received by the receive antenna 121. Each of the mixers 122 is coupled to the Gunn transmitter 114 by means of a coupler 126, as is the harmonic mixer 115. The lens 18 is used to image radar returns from an image scene onto each of the plurality of antenna elements 121a of the receive antenna 120.

The output of the multiplexer 124 is coupled to a radar signal processor 130 that includes an amplifier 131 coupled through a video blanking circuit 132 and an analog to digital (A/D) converter 133 to a range/Doppler processor 134. The output of the range/Doppler processor 134 is coupled to a detect/tracking processor 135 whose output is coupled to a display 136, for example. A master timing reference 137 is coupled to the waveform control circuit 113, the beam selector circuit 116, the video blanking circuit 132, the analog to digital (A/D) converter 133, the range/Doppler processor 134, and the detect/tracking processor 135 to control the timing of the signal flow between the various components of the system 100.

Thus, a stepped beam active array transmit antenna and radar system employing the transmit antenna has been disclosed. It is to be understood that the described embodiments are merely illustrative of some of the many specific embodiments which represent the principles of the present invention. Clearly, numerous and other arrangements can be readily devised by those skilled in the art without departing from the scope of the invention.

What is claimed is:

1. A stepped beam active array transmit antenna comprising:
   (a) a feed array comprising:
      a dielectric substrate;
      a plurality of radiating elements disposed on the substrate wherein each radiating element comprises two coplanar and coextensive fins that are separated by a narrow gap and that are tapered at their radiating end to form a linear tapered slot feed aperture;
      switching means respectively coupled to each of the radiating elements;
      a backshort disposed adjacent the tapered slot feed aperture of each of the radiating elements;
      a low pass filter disposed adjacent the backshort of each of the radiating elements; and
      a switching diode disposed between the backshort and the tapered slot feed aperture 35 of each of the radiating elements;
   (b) a power distribution network comprising a suspended printed line; and
   (c) a lens disposed adjacent the radiating ends of the plurality of radiating elements.

2. The transmit antenna of claim 1 wherein the lens comprises a polystyrene lens.

3. The transmit antenna of claim 1 wherein the suspended printed line is comprised of a printed feed line disposed on a dielectric substrate that is located within the power distribution network a predetermined distance from a bottom surface of the dielectric substrate.

4. The transmit antenna of claim 1 wherein the dielectric backing plate is comprised of plastic.

5. The transmit antenna of claim 1 wherein the power distribution network comprises:
   a metal backplate; and
   a plurality of sidewalls comprising wall shims that are disposed between the metal backplate and a bottom surface of the dielectric substrate.

6. The transmit antenna of claim 1 further comprising a dielectric backing plate secured to the dielectric substrate and the power distribution network.

7. The antenna of claim 1 wherein the backshort comprises ceramic material.

8. Radar apparatus comprising:
   (a) a millimeter wave radar transmitter;
   (b) a stepped beam active array transmit antenna coupled to the radar transmitter that comprises:
   (c) a feed array comprising:
      a dielectric substrate;
      a plurality of radiating elements disposed on the substrate that each comprise two coplanar and coextensive fins that are separated by a narrow gap and that are tapered at their radiating end to form a linere: tapered slot feed aperture;
      switching means respectively coupled to each of the radiating elements;
      a backshort disposed adjacent the tapered slot feed aperture of each of the radiating elements;
      a low pass filter disposed adjacent the backshort of each of the radiating elemen; and
      a switching diode disposed between the backshog and the tapered slot feed aperture of each of the radiating elements;
   (d) a power distribution network comprising a suspended printed line; and
   (e) a receive antenna that includes:
      a plurality of antenna elements:
      a plurality of mixers respectively coupled to outputs of the plurality of antenna elements and coupled to the transmitter by means of a coupler;
      a plurality of filter circuits respectively coupled to outputs of the plurality of mixers:
      a multiplexer coupled to outputs of the plurality of filter circuits that comprises as a multiple input, single output switch for sequentially outputting video signals derived from radar signals received by each of the receive antenna elements; and
   (f) a radar signal processor coupled to the receive antenna for processing radar return signals to produce radar output signals; and
   (g) a lens for transmitting radar signals produced by the transmit antenna and for imaging radar returns onto each of the plurality of receive antenna elements of the receive antenna.

* * * * *